US006904715B1

(12) United States Patent
Lawton (10) Patent No.: US 6,904,715 B1
(45) Date of Patent: Jun. 14, 2005

(54) GROWTH CONTAINERS (75) Inventor: Peter A. Lawton, Berwick (AU)

(73) Assignee: Trentcom APS PTY LTD, (AU)

( * ) Notice: Subject to any disclaimer, the term of this patent is extended or adjusted under 35 U.S.C. 154(b) by 0 days.

(21) Appl. No.: 10/129,879

(22) PCT Filed: Nov. 13, 2000

(86) PCT No.: PCT/AU00/01389

§ 371 (c)(1),
(2), (4) Date: Sep. 8, 2002

(87) PCT Pub. No.: WO01/35722

PCT Pub. Date: May 25, 2001

(30) Foreign Application Priority Data

Nov. 12, 1999 (AU) .................................. PQ4029

(51) Int. Cl.[7] .............................................. A01G 9/02
(52) U.S. Cl. .............................. 47/66.3; 47/78; 47/65.7
(58) Field of Search .............................. 47/66.1, 65.7, 47/32.7, 32.8, 66.3, 78, 73, 76, 77

(56) References Cited

U.S. PATENT DOCUMENTS

| 1,031,713 | A | * | 7/1912 | Hills .............................. 47/73 |
| 1,776,375 | A | * | 9/1930 | Russell ........................... 47/73 |
| 2,219,690 | A | * | 10/1940 | Leydecker ...................... 47/76 |
| 3,291,437 | A | * | 12/1966 | Bowden et al. ................ 249/48 |
| 3,471,192 | A | * | 10/1969 | Childs et al. ............... 294/50.7 |
| 3,662,490 | A | * | 5/1972 | Childs .................... 47/1.01 R |
| 4,628,634 | A | * | 12/1986 | Anderson ....................... 47/73 |
| 4,716,680 | A | * | 1/1988 | Whitcomb et al. ............. 47/73 |
| 4,850,136 | A | * | 7/1989 | Vollers ........................... 47/43 |
| 4,939,865 | A | * | 7/1990 | Whitcomb et al. ............. 47/77 |
| 5,359,809 | A | * | 11/1994 | Johnson ......................... 47/73 |

FOREIGN PATENT DOCUMENTS

| AU | 60411/86 | 10/1987 | .......... A01G 23/04 |
| AU | 611917 | 10/1989 | ............ A01G 9/02 |
| AU | 629067 | 5/1991 | ............ A01G 9/02 |
| AU | 51865/93 | 6/1994 | ............ A01G 9/02 |
| AU | 701466 | 1/1999 | ............ A01G 9/02 |
| GB | 230928 A | 11/1990 | ............ A01G 9/02 |
| WO | WO 90/12493 | 11/1990 | ............ A01G 9/02 |
| WO | WO 99/15000 | 4/1999 | ............ A01G 9/02 |

* cited by examiner

Primary Examiner—Teri P. Luu
Assistant Examiner—T. Nguyen
(74) Attorney, Agent, or Firm—Marsh Fischmann & Breyfogle LLP (57) ABSTRACT A panel (10) for use as a side wall of a plant growth container is disclosed. In one embodiment the panel (10) comprises an elongate cuspated sheet (11) having apertures formed in at least some of the outwardly projecting cusps to facilitate air root pruning of the root structure of a plant grown within the container. The sheet (11) includes a non-cuspated edge section (12), the non-cuspated edge section (12) being co-operable with a complementary edge section (13) of the same sheet (11) or of an adjacent sheet. The co-operable edge sections (12, 13) form a guideway for holding means (32), the holding means (32) passing along the guideway releasably hold the edge sections (12, 13) in use form a side wall of the container. A plant growth container having at least one panel (10) as described is also disclosed.

21 Claims, 9 Drawing Sheets

GROWTH CONTAINERS

FIELD OF THE INVENTION

The present invention is directed to improvements in or relating to plant growth containers, and is more particularly directed to improvements to the formation of a walled plant growth container for air root pruning of the plant.

BACKGROUND OF THE INVENTION

Air root pruning of the root structure of a growing plant is well-known from, for example, the specifications of Australian Patent Nos 611917, 629067, 674543 and that of Petty Patent No 701466.

These specifications all generally disclose a plant growth container having a side wall formed from a cuspated sheet having holes formed in at least some of the outwardly projecting cusps to facilitate air root pruning of the root structure of a plant grown within the container. The side wall of the container is generally formed from a plurality of similar panels which are fastened together in various ways.

For example, Australian Patent No 611917 describes a method and container for growing transplantable plants, the container comprising a set of identical upwardly extending side panels which are removably joined together at their vertical edges by two sets of mortise and tenon joints positioned in spaced relationship on the panels. One set of mortise and tenon joints when connected is said to prevent lateral movement between the side panels, whilst the second set is said to prevent longitudinal movement therebetween.

Australian Patent No 629067 describes fastening means to hold a cuspated sheet in overlapping, nested engagement. The fastener disclosed comprises a rivet or releasable fastening means in the form of a strap or tie which passes through aligned holes at the overlap, or an adjustable strap or belt which extends around the circumference of the container.

Australian Patent No 674543 describes a resilient fastener in the form of a clip which engages either side of two overlapping edge portions of a panel which form the vertical sides of the plant growth container.

Australian Petty Patent No 701466 describes a cuspated sheet being arranged with a first edge portion overlapping either an opposite second edge portion of the same sheet or a second edge portion of another similar sheet, the protuberances of the outer surface of the second edge portion nesting within the recesses of the inner surface of the first edge portion to align openings in the protuberances at the overlap. At least one screw threaded fastener is located within the aligned openings, the fastener having a helical threaded shank and an enlarged head on one end of the shank, the threads having a sufficiently large depth between a crest of the thread and the shank to enable, in use, secure retention against the inner surface of the overlapping portions of the sheet or sheets thereby securing the overlapping edge portions together.

It has been observed that the fastening arrangements disclosed in the above specifications have a number of shortcomings. In the case of fasteners in the form of screws or rivets, it has been observed that the formation of a container using fastening means in that form can be time consuming, particularly in cases where a drill, rivet gun or screw driver is required to secure the panels together. Fastening of the container in that way can also lead to significant difficulties in readily dismantling the container.

In the case of a fastener in the form of a wire clip, the open-ended nature of the clip can lead to hand or finger damage to a user when attempting to secure the clip to the container. In addition, the strength of the fastening is to a great extent dependent on the degree of resilience of the material from which the clip is formed, which is likely to degrade over time, reducing the efficacy of the clip. Furthermore, the clip arrangement can require significant overlap of the edge portions of a sheet or adjacent sheets, at least partially (and in some cases significantly) reducing the number of cuspations available for air root pruning.

The foregoing does not constitute an admission as to the state of common general knowledge in the art as it existed at the priority date of a claim of this application.

SUMMARY OF THE INVENTION

The present invention accordingly provides in one embodiment a panel for use as a side wall of a plant growth container, the panel comprising an elongate cuspated sheet having apertures formed in at least some of the outwardly projecting cusps to facilitate air root pruning of the root structure of a plant grown within the container, the sheet including a non-cuspated edge section, the non-cuspated edge section being cooperable with a complementary edge section of the same sheet or of an adjacent sheet, the cooperable edge sections forming a guideway for holding means, the holding means passing along the guideway to releasably hold the edge sections whereby in use to form a side wall of the container.

The cuspated sheet is preferably sufficiently flexible to enable it to be formed by bending into a curved side wall of the container.

An edge section according to the invention extending along an edge of the sheet is typically an upright edge section when the panel is in its intended orientation in use as an upright side wall of a container. The edge section preferably extends in use substantially vertically, as does the side wall of the container.

Edge sections according to the invention may overlap. They may interleave. They may interengage. An edge section may accordingly include an engagement portion adapted to engage a complementary engagement portion of the same sheet or of an adjacent sheet. The registry of the edge sections on engagement forms a guideway for the holding means passing along the guideway to releasably hold the edge sections in registry whereby to form a side wall of the container.

An engagement portion according to the invention is typically disposed along an edge section in a substantially vertical direction when the panel is in its intended orientation in use as an upright side wall of a container. Other engagement portion orientations are envisaged within the scope of the invention.

A complementary edge section according to the invention may be cuspated or non-cuspated.

A non-cuspated edge section according to the invention may take any suitable form. It may be a substantially planar section. It may be a non-planar section. In one embodiment the non-cuspated edge section comprises a spine. The spine may comprise a pair of opposed elongate bands connected by a plurality of spaced apart ribs. The ribs may be curved to define part of the guideway for holding means according to the invention. The arrangement is preferably such that the ribs carried by one edge section are receivable in complementary recesses defined by the spaces between spaced apart ribs of an edge section of the same sheet or of an adjacent sheet whereby the ribs interleave to form a guideway therebetween. Other non-cuspated edge section arrangements are envisaged within the scope of the present invention.

A complementary engagement portion according to the invention may be cuspated or non-cuspated.

A non-cuspated engagement portion according to the invention may take any suitable form. It may be a substantially planar section. It may be a non-planar section. In one embodiment the non-cuspated engagement portion comprises a spine. The spine may comprise a pair of opposed elongate bands connected by a plurality of spaced apart ribs. The ribs may be curved to define part of the guideway for holding means according to the invention. Complementary curved ribs carried by another engagement portion may accordingly in this embodiment define a guideway having a cross-section approximating the cross-section of holding means for passing along the guideway. The arrangement is preferably such that the ribs carried by one engagement portion are receivable in complementary recesses defined by the spaces between spaced apart ribs of an edge section of the same sheet or of an adjacent sheet. Other non-cuspated engagement portion arrangements are envisaged within the scope of the present invention.

The present invention provides in another separate embodiment a panel for use as a side wall of a plant growth container, the panel comprising an elongate cuspated sheet having apertures formed in at least some of the outwardly projecting cusps to facilitate air root pruning of the root structure of a plant grown within a container, the sheet including opposed non-cuspated edge sections, the non-cuspated edge sections being cooperable with one another or with a complementary non-cuspated edge section of an adjacent sheet, the cooperable edge sections when brought together forming a guideway for holding means, the holding means passing along the guideway to releasably hold the edge sections whereby in use to form a side wall of the container.

The present invention provides in another separate embodiment a plant growth container having at least one panel for forming a side wall of the container, the panel comprising an elongate cuspated sheet having apertures formed in at least some of the outwardly projecting cusps to facilitate air root pruning of the root structure of a plant grown within a container, the sheet including a non-cuspated edge section, the non-cuspated edge section being cooperable with a complementary edge section of the same sheet or of an adjacent sheet, the cooperable edge sections forming a guideway for holding means, the holding means passing along the guideway to releasably hold the edge sections whereby to form a side wall of the container.

The present invention provides in another separate embodiment a plant growth container having at least one panel for forming a side wall of the container, the panel comprising an elongate cuspated sheet having apertures formed in at least some of the outwardly projecting cusps to facilitate air root pruning of the root structure of a plant grown within a container, the sheet including opposed non-cuspated edge sections, the non-cuspated edge sections being cooperable with one another or with a complementary non-cuspated edge section of an adjacent sheet, the cooperable edge sections when brought together forming a guideway for holding means, the holding means passing along the guideway to releasably hold the edge sections whereby to form a side wall of the container.

The holding means according to the invention is preferably in the form of a rod. The arrangement is preferably such that the rod is capable of being inserted in the guideway and passed along the guideway. It will be readily apparent to the skilled addressee that the rod may be of any convenient cross-sectional shape. The rod may be tapered. The rod may be substantially circular or substantially non-circular in cross-section. The rod may be cross shaped in cross-section. The arrangement may be such that the external cross-sectional dimension of the holding means is greater in one direction than the internal cross-sectional dimension of the guideway. In this arrangement the action of the holding means passing along the guideway may have the effect of providing a tauter connection between the edge sections of the same sheet or of adjacent sheets. This can be of benefit in cases where the tolerances of the sheet manufacturing process are variable, which can require as a consequence corresponding adjustment of the relative distance-between edge sections of a sheet or of an adjacent sheet when brought together for assembly.

The rod may be provided with a grip. The grip may be in the form of an element extending transversely to the longitudinal axis of the rod.

The holding means may be rotatable in the guideway. Rotation of the holding means in the guideway has the effect of urging the edge sections toward or away from one another in an embodiment where the external cross-sectional dimension of the holding means is greater in one direction than the internal cross-sectional dimension of the guideway. Rotation of the holding means in the guideway can be to any suitable degree, and is typically through up to about 180°, and more typically through about 90°.

The holding means in the form of a rod may include a recess engageable with a rim of the base. Engagement of the recess with the rim may be effected by rotation of the rod in the guideway to locate the rim in the recess. This arrangement assists in facilitating a secure connection between edge sections.

In one particularly preferred embodiment the holding means comprises an elongated rod having a substantially oval cross-section, the long dimension of the oval being greater than a width dimension of the guideway in any direction, the rod being rotatable in the guideway to adjust the distance between edge sections of the same sheet or of adjacent sheets whereby to adjust a width dimension of a container having a side wall formed in that manner.

Other holding means arrangements are envisaged within the scope of the invention.

A plant growth container according to the invention may include one or more handles. The handle may be attachable to a panel as described. In an alternative embodiment the handle may be attachable to holding means according to the invention.

The handle may be pivotable relative to the component to which it is attached. The handle may comprise a loop. The loop may be of sufficient dimension or diameter to fit over at least one cuspation of the sheet to provide an additional means of maintaining the structural integrity of the container when assembled.

A guideway according to the invention may take any suitable form. It may comprise a recess. It may comprise a channel. The channel may comprise an open or a closed channel. The boundaries defining the channel may be deformable.

The arrangement may be such that the cooperable or engageable edge sections form a guideway for the holding means which comprises a pair of opposed channels or recesses. In this embodiment the holding means comprises a bifurcated rod, the branches of the rod passing along respective ones of the opposed channels or recesses.

A guideway according to the invention may be tapered so that the internal dimension of the tapered section of the guideway is less than the external dimension of the holding means passing along that part of the guideway. In this arrangement the action of the holding means passing along the guideway may have the effect of providing a tauter connection between the edge sections of the same sheet or of adjacent sheets. Other guideway arrangements are envisaged within the scope of the invention.

In one particularly preferred embodiment the movement of the rod along the guideway facilitates a sequential wedge action, that is, the arrangement of the guideway and the rod is such that as the rod passes along the guideway the edge sections are progressively or sequentially drawn together.

The cuspations of a sheet according to the present invention will preferably be those having a configuration such as that described in the abovementioned Australian patent specifications. Accordingly the cuspations on either side of the sheet may be symmetrical or asymmetrical.

A plant growth container according to the invention is preferably generally cylindrical in shape and having an open top when assembled as is known in the art, although other container shapes are envisaged within the scope of the invention. The container when assembled is adapted to receive growth media and a plant such as a tree, shrub or other flora as is also known. The container is typically adapted in use to sit on or above ground.

The plant growth container preferably comprises a base. The base may be perforated or non-perforated. The base may be provided with at least one foot to raise the base above the ground to maintain a distance between the base and the ground whereby to assist in aeration and/or drainage of the container when filled with growth media. It may also assist with plant hygiene. The base is preferably adapted to be received in a recess formed between adjacent substantially horizontal rows of cuspations and held in the recess following assembly of the container.

The present invention provides in another separate embodiment a plant growth container having at least one panel for forming a side wall of the container, the panel comprising an elongate cuspated sheet having apertures formed in at least some of the outwardly projecting cusps to facilitate air root pruning of the root structure of a plant grown within the container, the sheet including an edge section, the edge section being cooperable with a complementary edge section of the same sheet or of an adjacent sheet to releasably hold the edge sections whereby to form a side wall of the container, and further comprising adjustment means to adjust the distance between the edge sections of the same sheet or of adjacent sheets.

Adjustment means according to the invention may take any suitable form. In one embodiment the adjustment means comprises a rod rotatable in a guideway formed between edge sections of the same sheet or of adjacent sheets when the edge sections are brought together, the arrangement being such that the distance between the edge sections is adjusted by said rotation. The rod may be as described herein.

The present invention provides in another separate embodiment a method for assembling a plant growth container having at least one panel for forming a side wall of the container and a base, the method including the steps of providing at least one panel as described herein, positioning a rim of the base in a recess formed between adjacent substantially horizontal rows of cuspations, the base being held in the recess following assembly of the container, bringing the edge sections of the panel together to form a guideway for holding means, and passing the holding means along the guideway to releasably hold the edge sections together forming a side wall of the container, whereby to form an assembled container.

In one particularly preferred embodiment according to the invention there is provided a panel for use as a side wall of a plant growth container, the panel comprising an elongate cuspated sheet having apertures formed in at least some of the outwardly projecting cusps to facilitate air root pruning of the root structure of a plant grown within the container, the sheet including opposed non-cuspated edge sections, each edge section comprising a spine having a pair of elongate bands connected by a plurality of spaced apart ribs, the spaced apart ribs of the edge sections capable of interleaving, interengaging or otherwise cooperating with an opposed edge section or with a complementary edge section of an adjacent sheet, the interleaving edge sections when interleaved forming a guideway for holding means in the form of a rod of substantially non-circular cross-section, the rod being capable of being inserted in, the guideway and passed along the guideway, to releasably hold the edge sections whereby in use to form a side wall of the container, the rod capable of rotation in the guideway to adjust the distance between the interleaved edge sections.

In another particularly preferred embodiment according to the present invention there is provided a plant growth container having at least one panel for forming a side wall of the container and a base, the panel comprising an elongate cuspated sheet having apertures formed in at least some of the outwardly projecting cusps to facilitate air root pruning of the root structure of a plant grown within the container, the sheet including opposed non-cuspated edge sections, each edge section comprising a spine having a pair of elongate bands connected by a plurality of spaced apart ribs, the spaced apart ribs capable of interleaving, interengaging or otherwise cooperating with an opposed edge section or with a complementary edge section of an adjacent sheet, the interleaving edge sections when interleaved forming a guideway for holding means in the form of a rod of substantially non-circular cross-section, the rod being capable of being inserted in the guideway and passed along the guideway to releasably hold the edge sections whereby to form a side wall of the container, the rod capable of rotation in the guideway to adjust the distance between the interleaved edge sections, the base being adapted to be received in a recess formed between adjacent substantially horizontal rows of cuspations and held in the recess following assembly of the container.

The present invention provides in another separate embodiment a plant growth container assembly kit, the kit comprising the following components:

(a) a panel for use as a side wall of the container, the panel comprising an elongate cuspated sheet having apertures formed in at least some of the outwardly projecting cusps to facilitate air root pruning of the root structure of a plant grown within the container, the sheet including a non-cuspated edge section, the non-cuspated edge section being cooperable with a complementary edge section of the same sheet or of an adjacent sheet, the cooperable edge sections forming a guideway for holding means, the holding means passing along the guideway to releasably hold the edge sections whereby in use to form a side wall of the container;

(b) holding means in the form of a rod; and (c) a base, the components when assembled forming said plant growth container.

One advantage of the constructions and arrangements of the present invention is that there is no significant overlap between the cuspations of a sheet or of adjacent sheets, thereby keeping substantially all of the cuspations available for air root pruning. Another advantage is that a plant growth container constructed according to the invention can be easily assembled and disassembled as compared to previously proposed screw thread or rivet fastening arrangements.

DESCRIPTION OF THE DRAWINGS

The invention will now be further explained and illustrated by reference to the accompanying drawings. In the drawings, in which like integers are given like numerals.

Figure 1:
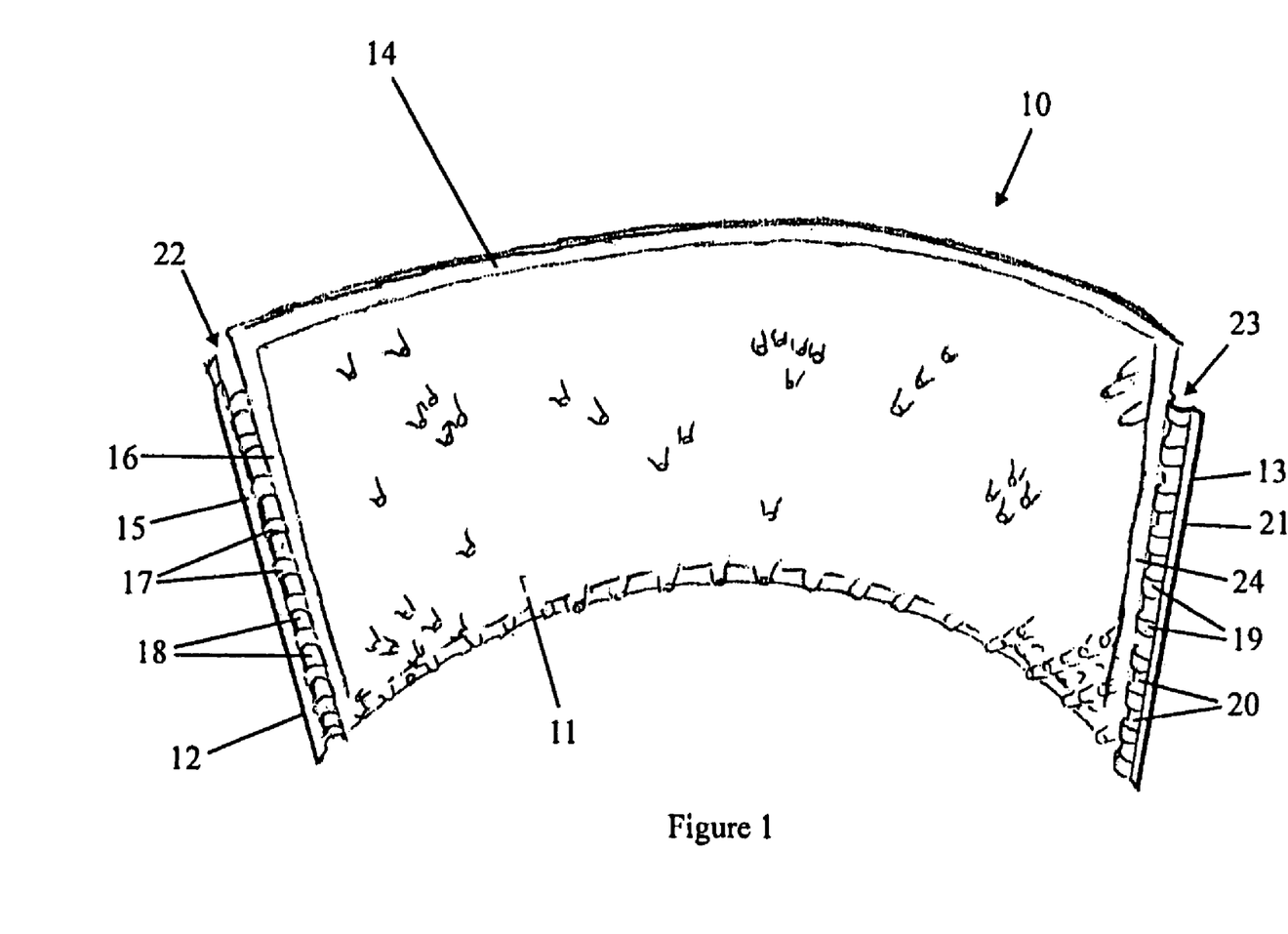
FIG. 1 is a perspective view of a panel according to an embodiment of the present invention.

Turning to the drawings, FIG. 1 shows generally a panel 10 for use as a side wall of a plant growth container. Panel 10 in the embodiment shown comprises an elongate cuspated sheet 11 having opposed edge sections 12, 13, and a band 14 extending along an upper marginal edge of sheet 11. It can be seen from FIG. 2 that sheet 11 has first and second cuspated surfaces 11a, 11b which are asymmetrical, although it will be appreciated that the surfaces can in other embodiments be symmetrical.

Band 14 in the embodiments has no cuspations. That has been found to assist in retention of water when the assembled container is initially flooded to promote root growth and in subsequent watering of the plant.

Opposed edge sections 12, 13 are non-cuspated. Edge sections 12, 13 in the embodiment shown extend substantially vertically when the panel 10 is in its intended orientation as an upright side wall of a plant growth container.

Figure 2:
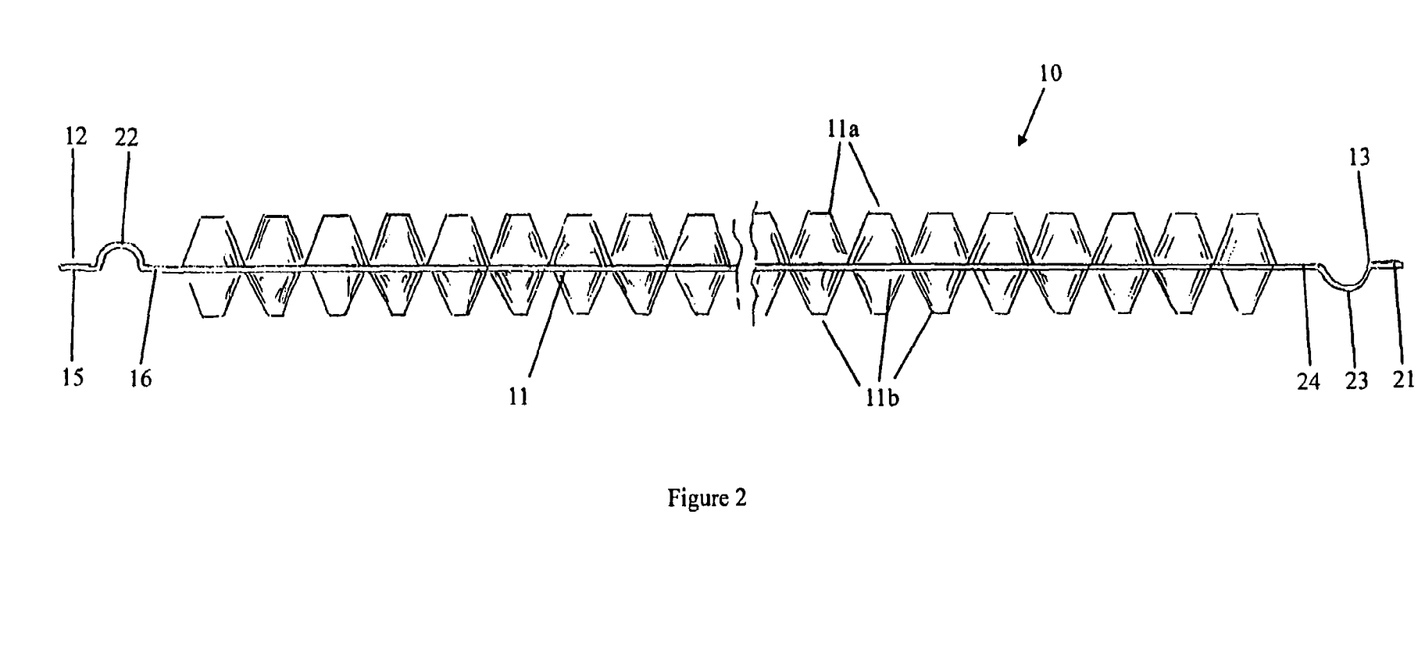
FIG. 2 is a side elevation of a panel according to an embodiment of the present invention.

Edge section 12 comprises a spine having a pair of opposed elongate bands 15, 16 connected by a plurality of spaced apart ribs 17. Recesses 18 are defined by the spaces between spaced apart ribs 17. In similar fashion edge section 13 comprises a spine having a pair of opposed elongate bands 21, 24 connected by a plurality of spaced apart ribs 19. Recesses 20 are defined by the spaces between spaced apart ribs 19. During assembly edge sections 12, 13, whether carried by the same sheet 11 or by adjacent sheets 11, 31, interleave, interengage or otherwise cooperate when brought together to define a guideway in the form of a channel comprising in the embodiments shown half-circles 22, 23.

Figure 3:
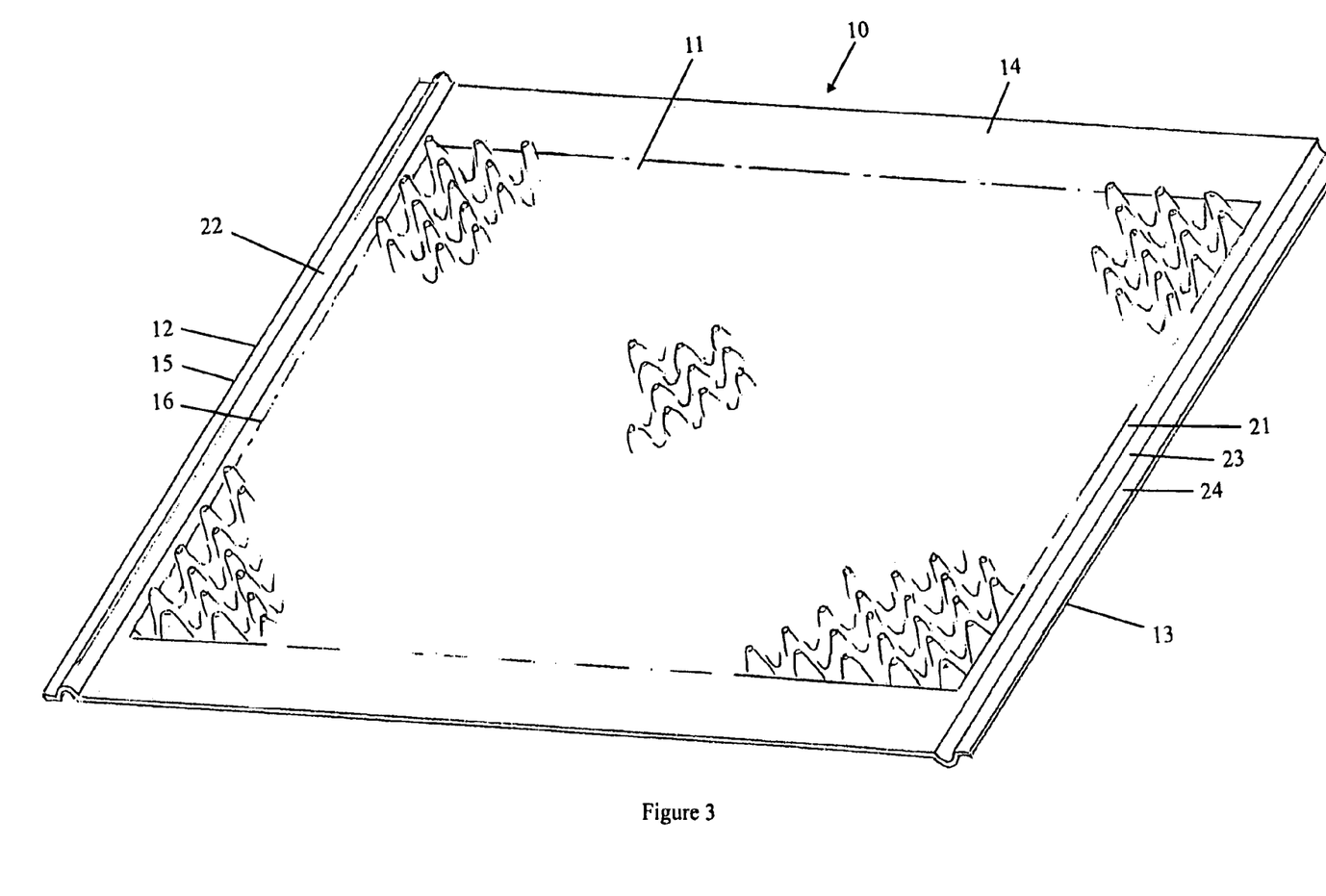
FIG. 3 is a perspective view of the panel of FIG. 2.
Figure 4:
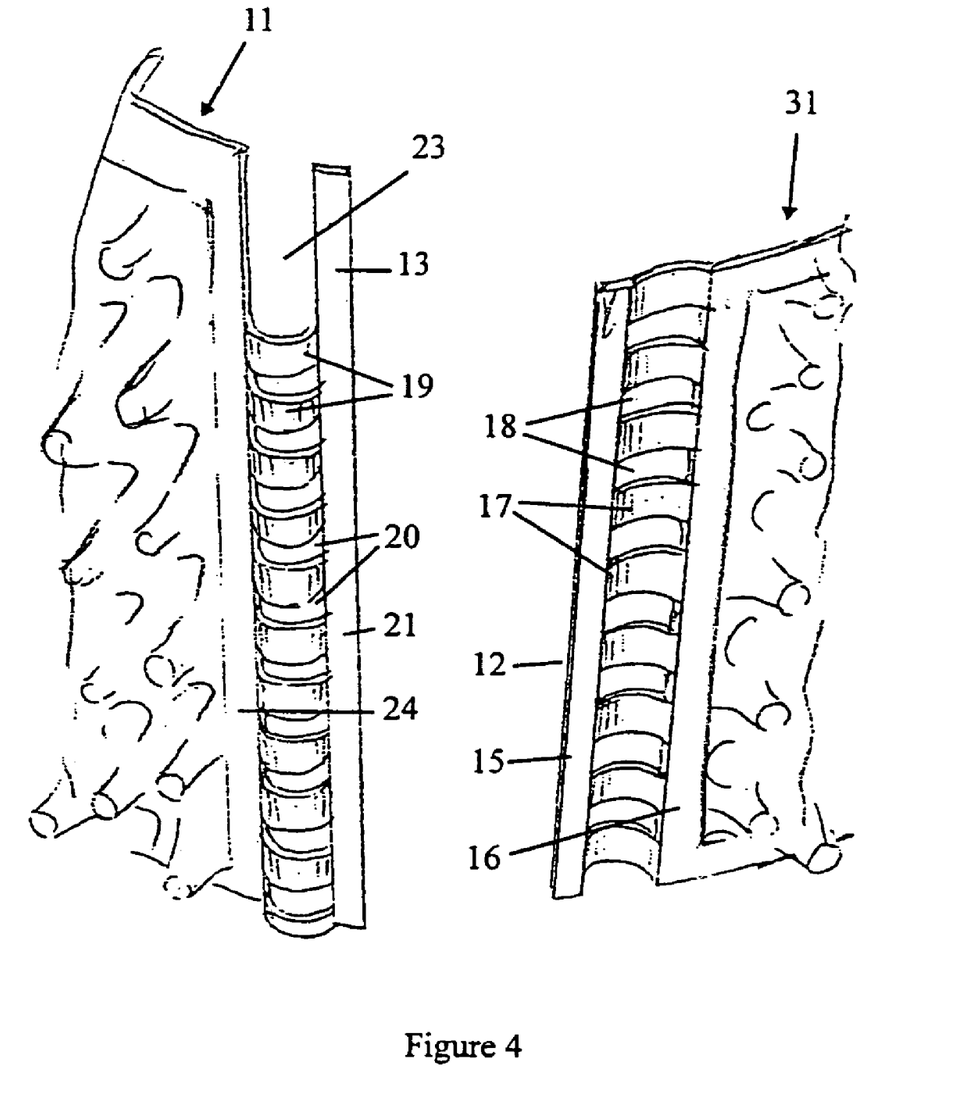
FIG. 4 is a perspective view in close-up of panel edge sections according to an embodiment of the present invention.

The embodiment of FIG. 3 shows an alternative edge section arrangement to the spine arrangement of FIG. 2, wherein edge sections 12, 13 have complementary engagement portions comprising a ridge and a recess capable of interengaging to define a guideway when half-circles 22, 23 are brought together.

Figure 5:
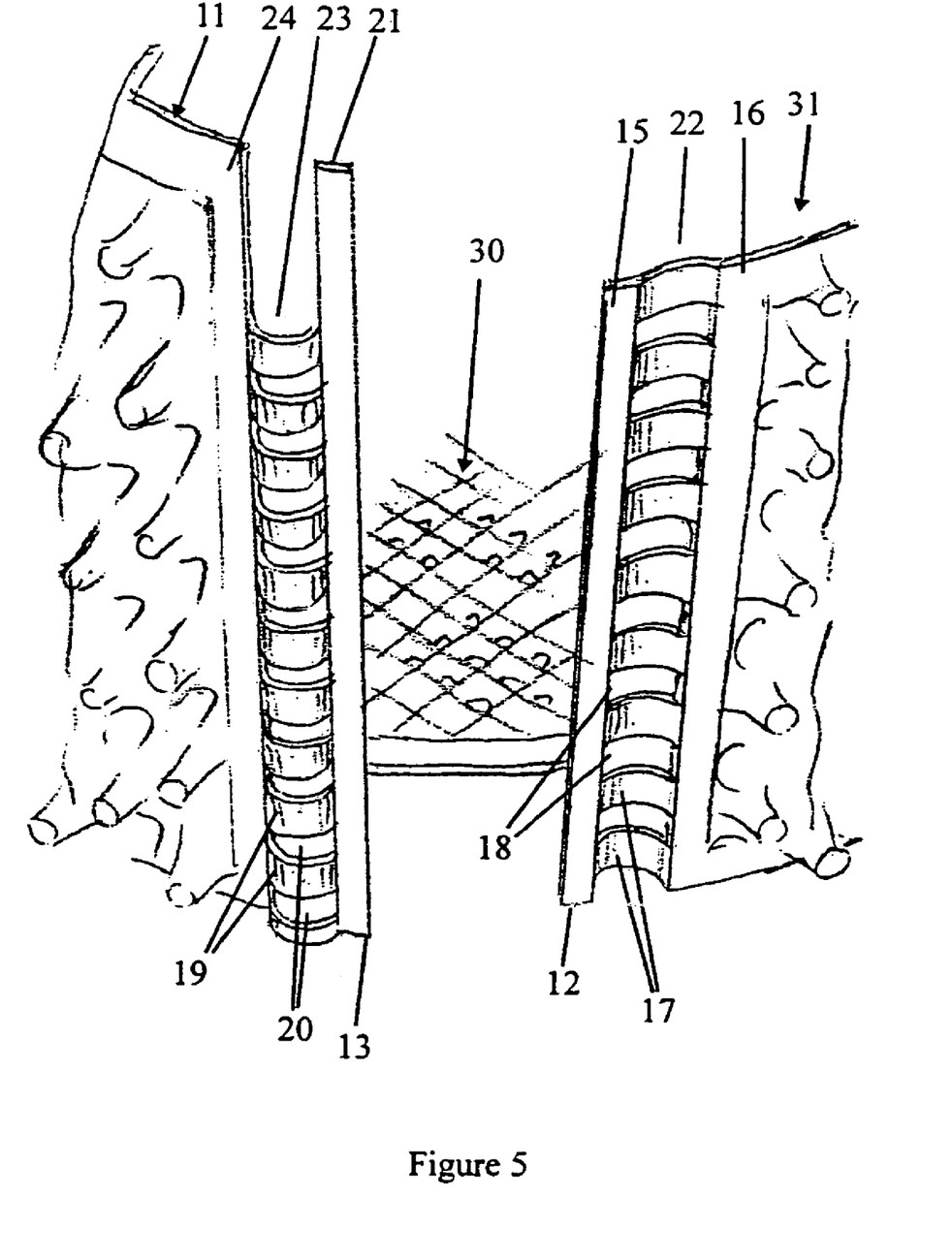
FIG. 5 is a perspective view in close-up of the edge sections of FIG. 4 and further showing a plant growth container base.

A perforated base 30 for the plant growth container may be provided as shown in FIG. 5. Although not clearly shown in that Figure, base 30 is adapted to be received in a recess formed between adjacent substantially horizontal rows of cuspations of sheet 11 or of sheets 11, 31, and held in the recess following assembly of the container. Also, although not shown, base 30 includes a plurality of feet to raise the base 30 above the ground to maintain a distance between the base 30 and the ground.

Figure 6:
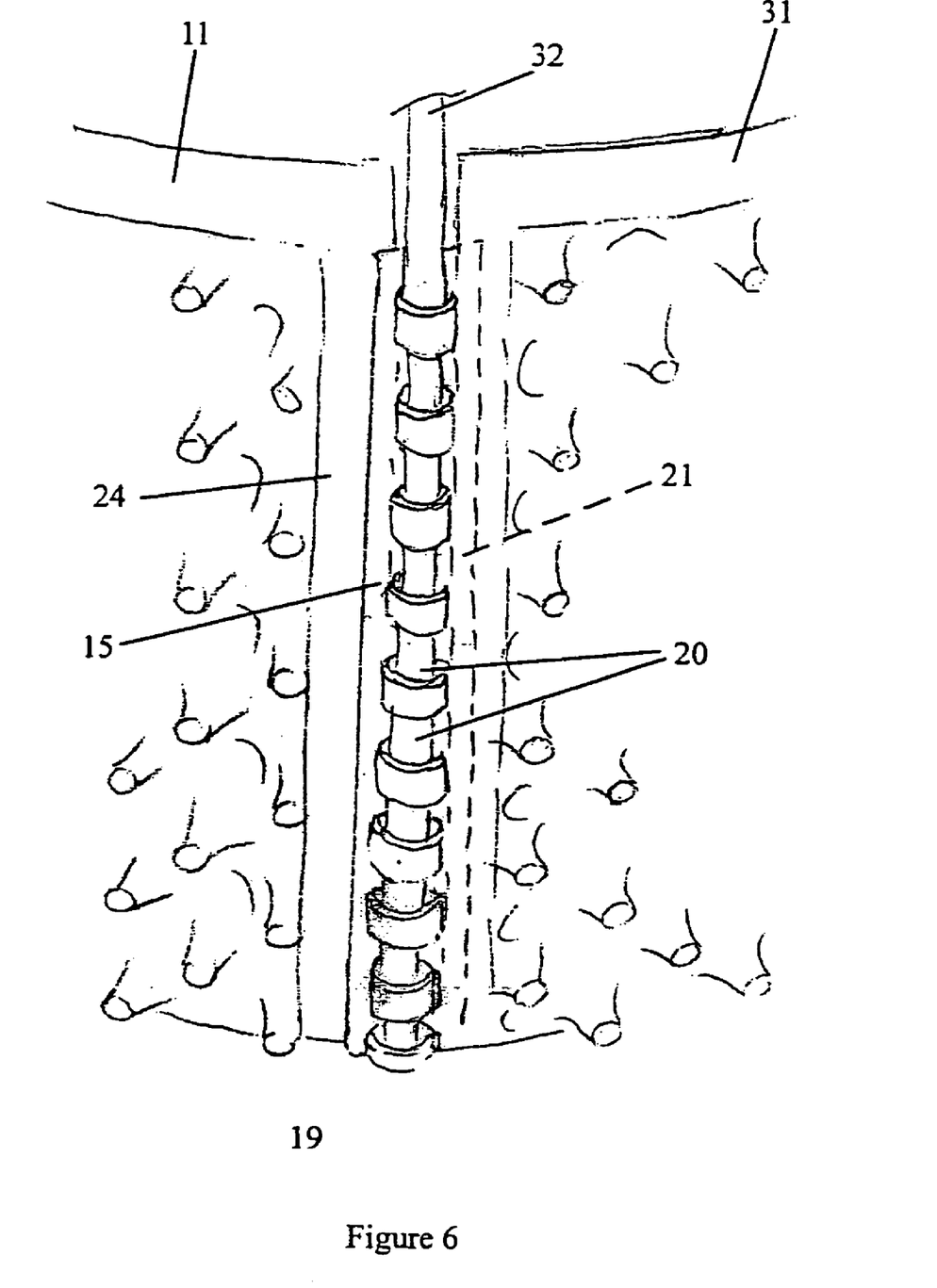
FIG. 6 is a perspective view of part of the wall of a plant growth container when assembled according to an embodiment of the present invention.
Figure 7:
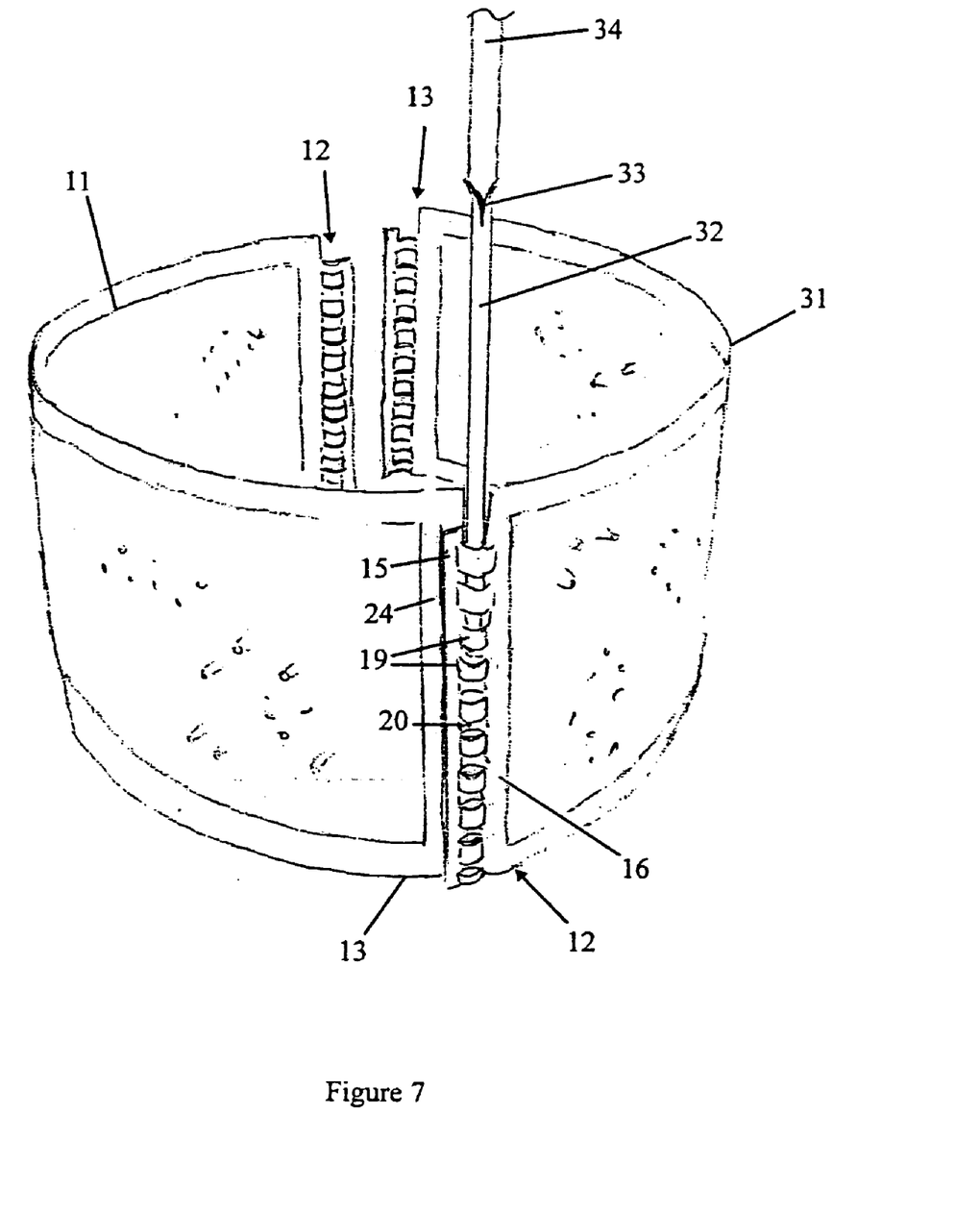
FIG. 7 is a perspective view of a partly disassembled plant growth container showing a holding means in the form of a rod partly withdrawn from the guideway.

FIGS. 6 and 7 illustrate holding means in the form of an elongated rod 32. Rod 32 is insertable in the guideway formed by the registry of edge sections 12, 13. Rod 32 on insertion can be passed along the guideway so formed to releasably hold the edge sections 12, 13 whereby to form a side wall of the container. In a particularly preferred embodiment, movement of the rod 32 along the guideway facilitates a sequential wedge action, that is, the arrangement of the guideway and the rod 32 is such that as the rod 32 passes along the guideway the edge sections 12, 13 are progressively or sequentially drawn together. In this manner, a tauter connection between the edge sections of the same sheet or of adjacent sheets may be effected.

Figure 9:
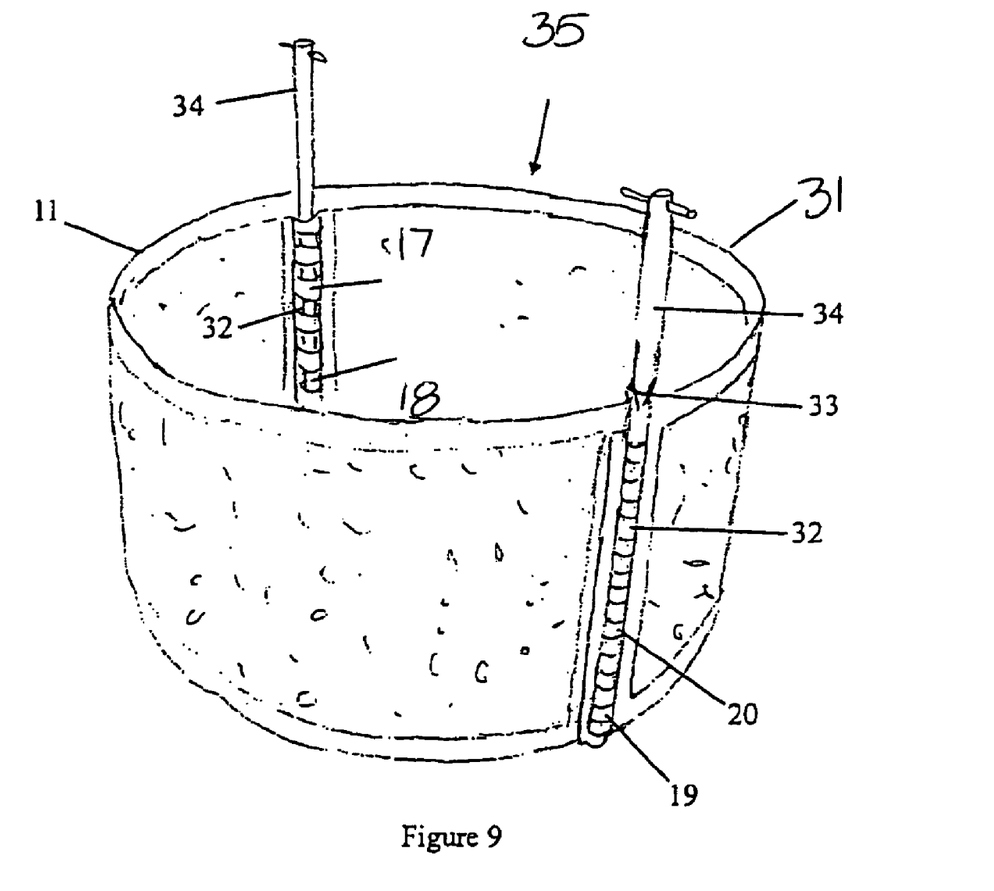
FIG. 9 is a perspective view of an assembled plant growth container formed from two panels according to an embodiment of the present invention.

As shown in Figures, rod 32 includes a taper 33, and FIG. 9 shows rods 32 having a grip 34 in the form of an element extending transversely to the longitudinal axis of the rod 32. Although not shown in the Figures, rod 32 may include a recess engageable with a rim of the base 30. Engagement of the recess with the rim may be effected by rotation of the rod in the guideway to locate the rim in the recess. This arrangement assists in facilitating a secure connection between edge sections.

Figure 8:
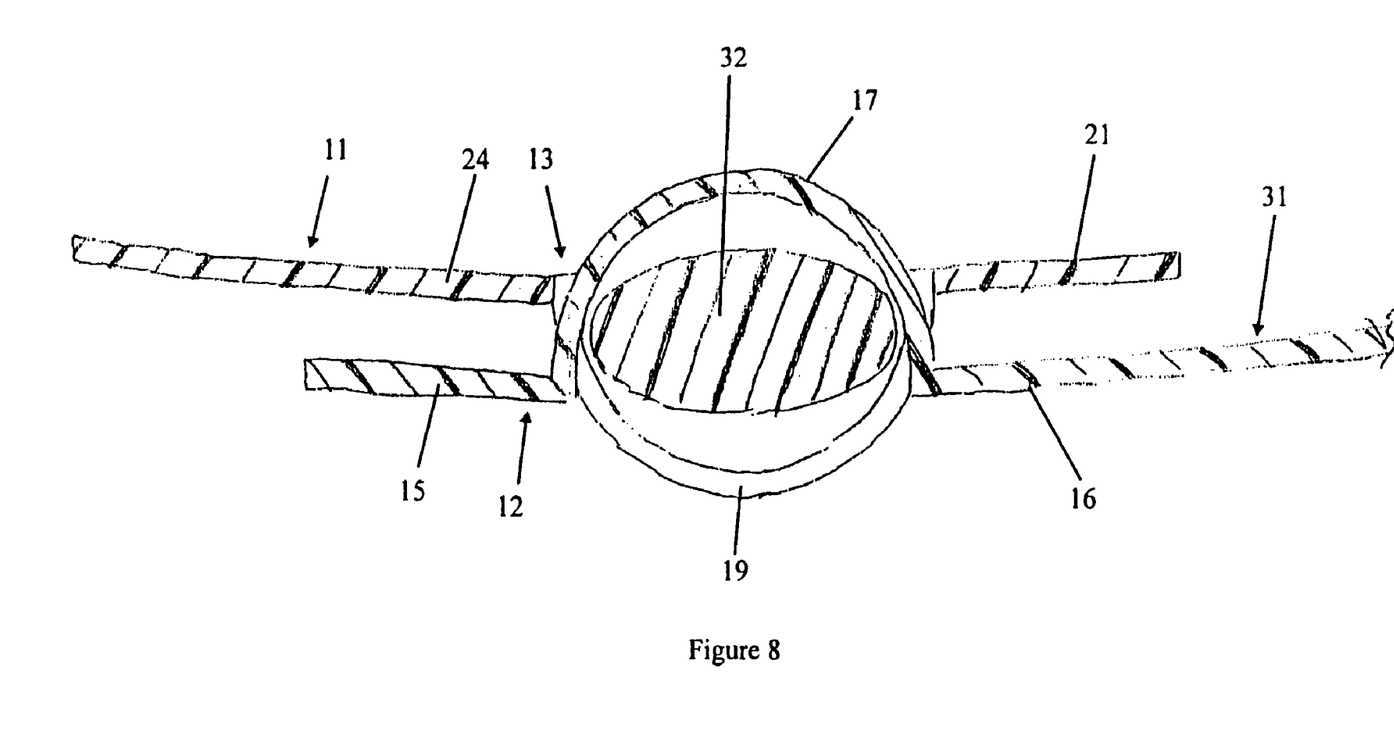
FIG. 8 is a cut-away end cross-section of a guideway and holding means in the form of a rod according to an embodiment of the present invention.

FIG. 8 illustrates rod 32, which in the embodiment shown is substantially oval in cross-section, in position in the guideway formed by the registry of ribs 18, 19. As can be seen from that Figure, the external cross-sectional dimension of the rod 32 is greater in one direction than the internal cross-sectional dimension of the guideway. Rotation of the rod 32 in the guideway may accordingly have the effect of urging the edge sections 12, 13 toward or away from one another. In this way the distance between edge sections can be adjusted.

The embodiment of FIG. 9 illustrates an assembled substantially cylindrical open-topped plant growth container 35 comprising a pair of panels 11, 31 for forming a side wall of the container 35. Each panel 11, 31 comprises an elongate cuspated sheet having apertures (not clearly shown) formed in at least some of the outwardly projecting cusps to facilitate air root pruning of the root structure of a plant (not shown) grown within the container 35. The sheets of panels 11, 31 each include opposed non-cuspated edge sections disposed substantially vertically when the container is in its intended orientation as shown. Each edge section has a spine having a pair of elongate bands connected by a plurality of spaced apart ribs. The spaced apart ribs of the edge sections are capable of interleaving, interengaging or otherwise cooperating with an edge section of similar configuration of an adjacent sheet to form a guideway. When interleaved the edge sections form a guideway for holding means in the form of rod 32. Rod 32 is capable of being inserted in and of passing along the guideway. Rod 32 releasably holds the edge sections whereby to form a side wall of the container 35. Rod 32 is capable of rotation in the guideway to adjust the distance between the interleaved edge sections.

Although not shown in FIG. 9, container 35 may include one or more handles. The handle may be attachable to a panel 11, 31 as described. In an alternative embodiment the handle may be attachable to rod 32. The handle may be pivotable relative to the component to which it is attached. The handle may comprise a loop. The loop may be of sufficient dimension or diameter to fit over at least one cuspation of the sheet of a panel 11, 31 to provide an additional means of maintaining the structural integrity of the container when assembled.

In use, to assemble a plant growth container 35 as described having a pair of panels for forming a side wall of the container and a base, a pair of panels 11, 31 as described are provided, and a rim of the base 30 positioned in a recess formed between adjacent substantially horizontal rows of cuspations of the panels, the base 30 being held in the recess following assembly of the container 35. The edge sections of the panels are brought together to form a guideway for holding means in the form of rod 32, and rod 32 is passed along the guideway to releasably hold the edge sections together forming a side wall of the container, whereby to form an assembled container 35 as shown. Rod 32 may be rotated in the guideway to adjust the distance between the edge sections.

The container may be easily disassembled by withdrawing rod 32 from the guideway, thereby gaining access to the interior of the container 35. In this manner a tree or other flora may be removed from the container and transplanted.

Following assembly the container may be filled with a growth medium and a seedling or other flora planted in the growth medium.

The word 'comprising' and forms of the word 'comprising' as used in this specification does not limit the invention claimed to exclude any variants or additions.

Modifications and improvements to the invention will be readily apparent to those skilled in the art. Such modifications and improvements are intended to be within the scope of this invention.

What is claimed is:

1. A panel for use as a side wall of a plant growth container, the panel comprising an elongate cuspated sheet having apertures formed in at least some of the outwardly projecting cusps to facilitate air root pruning of the root structure of a plant grown within the container, the sheet including a non-cuspated edge section, the non-cuspated edge section being cooperable with a complementary edge section of the same sheet or of an adjacent sheet, the cooperable edge sections forming a guideway for holding means, the guideway extending in a direction substantially parallel to the cooperable edge sections, the holding means being insertable in the guideway and passing along the guideway in a direction substantially parallel to the edge sections to releasably hold the cooperable edge sections whereby in use to form a side wall of the container.

2. A panel according to claim 1, wherein said edge sections comprise substantially planar interleaving bands.

3. A panel according to claim 1, wherein said cuspated sheet is sufficiently flexible to enable it to be formed by bending into a curved side wall of a plant growth container.

4. A panel according to claim 1, wherein said edge sections interengage, the registry of the edge sections on engagement forming said guideway for said holding means.

5. A panel according to claim 1, wherein said complementary edge section is non-cuspated.

6. A panel according to claim 1, wherein said non-cuspated edge section comprises a spine.

7. A panel according to claim 6, wherein said spine comprises a pair of opposed elongate bands connected by a plurality of spaced apart ribs.

8. A panel according to claim 7, wherein said ribs are curved to define part of the guideway for the holding means.

9. A panel according to claim 8, wherein said ribs are receivable in complementary recesses defined by the spaces between spaced apart ribs of an edge section of the same or an adjacent sheet whereby the ribs interleave to form guideway therebetween.

10. A panel for use as a side wall of a plant growth container, the panel comprising an elongate cuspated sheet having apertures formed in at least some of the outwardly projecting cusps to facilitate air root pruning of the root structure of a plant grown within the container, the sheet including opposed non-cuspated edge sections, each edge section comprising a spine having a pair of elongate bands connected by a plurality of spaced apart ribs, the spaced apart ribs of the edge sections capable of interleaving, interengaging or otherwise cooperating with an opposed edge section or with a complementary edge section of an adjacent sheet, the interleaving edge sections when interleaved forming a guideway for holding means in the form of a rod of substantially non-circular cross-section, the guideway extending in a direction substantially parallel to the edge sections, the rod being capable of being inserted in the guideway and passed along the guideway to releasably hold the edge sections whereby in use to form a side of the wall of the container, the rod capable of rotation in the guideway to adjust the distance between the interleaved edge sections.

11. A plant growth container having a side wall formed from at least one panel, the panel comprising an elongate cuspated sheet having apertures formed in at least some of the outwardly projecting cusps to facilitate air root pruning of the root structure of a plant grown within the container, the sheet including a non-cuspated edge section, the non-cuspated edge section being cooperable with a complementary edge section of the same sheet of an adjacent sheet, the cooperable edge sections forming a guideway for holding means, the guideway extending in a direction substantially parallel to the cooperable edge sections, the holding means being insertable in the guideway and passing along the guideway in a direction substantially parallel to the edge sections to releasably hold the cooperable edge sections whereby in use to form a side wall of the container.

12. A plant growth container according to claim 11, wherein said holding means comprises a rod capable of being inserted in the guideway and passed along the guideway.

13. A plant growth container according to claim 12, wherein said rod is non-circular in cross-section.

14. A plant growth container according to claim 13, wherein said rod is cross shaped in cross-section.

15. A plant growth container according to claim 12, wherein said rod is rotatable in said guideway to urge the edge sections towards or away from each other.

16. A plant growth container according to claim 12, wherein the arrangement of the rod and the guideway is such that as the rod passes along the guideway the edge sections are progressively or sequentially drawn together.

17. A plant growth container according to claim 12, and further including a base.

18. A plant growth container according to claim 17, wherein said rod is engageable with the base.

19. A plant growth container having at least one panel for forming a side wall of the container and a base, the panel comprising an elongate cuspated sheet having apertures formed in at least some of the outwardly projecting cusps to facilitate air root pruning of the root structure of a plant grown within the container, the sheet including opposed non-cuspated edge sections, each edge section comprising a spine having a pair of elongate bands connected by a plurality of spaced apart ribs, the spaced apart ribs capable of interleaving interengaging or otherwise cooperating with an opposed edge section or with a complementary edge section of an adjacent sheet, the interleaving edge sections when interleaved forming a guideway for holding means in the form of a rod of substantially non-circular cross-section, the guideway extending in a direction substantially parallel to the edge sections, the rod being capable of being inserted in the guideway and passed along the guideway to releasably hold the edge sections whereby to form a side wall of the container, the rod capable of rotation in the guideway to adjust the distance between the interleaved edge sections, the base being adapted to be received in a recess formed between adjacent substantially horizontal rows of cuspations and held in the recess following assembly of the container.

20. A plant growth container assembly kit, the kit comprising of the following components:
  (a) a panel for use as a side wall of the container, the panel comprising an elongate cuspated sheet having apertures formed in at least some of the outwardly projecting cusps to facilitate air root pruning of the structure of a plant grown within the container, the sheet including a non-cuspated edge section, the non-cuspated edge section being cooperable with a complementary edge section of the same sheet or of an adjacent sheet, the cooperable edge sections forming a guideway for holding means, the guideway extending in a direction substantially parallel to the cooperable edge sections, the holding means being insertable in the guideway and passing along the guideway in a direction substantially parallel to the edge sections to releasably hold the cooperable edge sections whereby in use to form a side wall of the container;
  (b) holding means in the form of a rod; and
  (c) a base, the components when assembled forming said plant growth container.

21. A method for assembling a plant growth container having at least one panel for forming a side wall of the container and a base, the method comprising the steps of providing at least one panel as claimed in claim 1, positioning a rim of the base in a recess formed between adjacent substantially horizontal rows of cuspations, the base being held in the recess following assembly of the container, bringing the edge sections of the panel together to form a guideway for holding means, and passing the holding means along the guideway to releasably hold the edge sections together forming a side wall of the container, whereby to form an assembled container.

* * * * *